(12) United States Patent
Belzer et al.

(10) Patent No.: US 11,729,195 B1
(45) Date of Patent: Aug. 15, 2023

(54) COMPUTERIZED-SYSTEM AND COMPUTERIZED-METHOD FOR DETECTING CYBER-ATTACKS ON AVIONIC COMMUNICATIONS OF AN AIRBORNE COMPUTERIZED-DEVICE

(71) Applicant: CYVIATION LTD., Herzliya (IL)

(72) Inventors: Nissim Belzer, Oranit (IL); Daniel Rezvani, Herzliya (IL)

(73) Assignee: CYVIATION LTD, Herzliya (IL)

( * ) Notice: Subject to any disclaimer, the term of this patent is extended or adjusted under 35 U.S.C. 154(b) by 0 days.

(21) Appl. No.: 17/945,137

(22) Filed: Sep. 15, 2022

(51) Int. Cl.
*H04L 9/40* (2022.01)
*H04L 12/40* (2006.01)

(52) U.S. Cl.
CPC .......... *H04L 63/1425* (2013.01); *H04L 12/40* (2013.01); *H04L 2012/4028* (2013.01)

(58) Field of Classification Search
None
See application file for complete search history.

(56) References Cited

U.S. PATENT DOCUMENTS

| | | | |
|---|---|---|---|
| 4,414,539 A * | 11/1983 | Armer | G08B 19/00 340/510 |
| 7,581,002 B2 | 8/2009 | Royalty | |
| 7,788,699 B2 | 8/2010 | Largman et al. | |
| 8,350,725 B2 | 1/2013 | Leclercq | |
| 8,474,008 B2 | 6/2013 | Leconte | |
| 8,572,734 B2 | 10/2013 | McConnell | |

(Continued)

FOREIGN PATENT DOCUMENTS

| | | |
|---|---|---|
| EP | 2722762 | 4/2014 |
| EP | 3133781 | 2/2017 |

(Continued)

OTHER PUBLICATIONS

To defeat the airborne hack attack—http://www.raytheoncyber.com/news/feature/cyberjacked_video.html.

(Continued)

*Primary Examiner* — Kambiz Zand
*Assistant Examiner* — Mahabub S Ahmed
(74) *Attorney, Agent, or Firm* — Soroker Agmon Nordman Riba (57) ABSTRACT

A computerized-system for anomaly detection of Point-to-Point avionic communication messages via a message-bus between an entity to one or more aircraft-systems in an aircraft during phases of flight, is provided herein. The computerized-system may include a bus-message queue to store bus-avionic-communication-messages transmitted via one or more input buses; an anomaly queue to store anomaly bus-messages; a memory to store the bus-message queue and the anomaly queue; a C-BIT mechanism to operate one or more preconfigured test routines; and one or more processors to operate a rule engine based on a preconfigured ruleset to detect one or more anomalies of bus-avionic-communication-messages for each bus-message in the bus-message queue; The rule engine may be configured to store each bus-message that is detected as an anomaly in the anomaly queue and to send one or more alerts to be presented via one or more external devices for each bus-message in the anomaly queue.

16 Claims, 4 Drawing Sheets

(56) References Cited

U.S. PATENT DOCUMENTS

| | | | |
|---|---|---|---|
| 8,949,668 B2 | 2/2015 | Hanks | |
| 8,977,843 B2 | 3/2015 | Gutt | |
| 9,171,167 B2 | 10/2015 | Ayyagari et al. | |
| 9,178,897 B2 | 11/2015 | Bush | |
| 9,185,124 B2 | 11/2015 | Chakraborty | |
| 9,215,244 B2 | 12/2015 | Ayyagari et al. | |
| 9,245,116 B2 | 1/2016 | Evans et al. | |
| 9,313,773 B2 | 4/2016 | DuBois et al. | |
| 9,369,484 B1 | 6/2016 | Lacerte | |
| 9,369,868 B2 | 6/2016 | Nguyen et al. | |
| 9,560,071 B2 | 1/2017 | Ruvio et al. | |
| 9,578,047 B2 | 2/2017 | Leifenfeld et al. | |
| 9,591,005 B2 | 3/2017 | Buehler et al. | |
| 9,591,009 B2* | 3/2017 | Craig | H04L 63/1425 |
| 2003/0065428 A1* | 4/2003 | Mendelson | G05D 1/0055 701/9 |
| 2009/0281864 A1 | 11/2009 | Abercrombie | |
| 2010/0042283 A1* | 2/2010 | Kell | G06Q 10/0875 705/29 |
| 2014/0245454 A1 | 8/2014 | Lee et al. | |
| 2014/0327564 A1 | 11/2014 | Sampigethaya | |
| 2015/0113649 A1* | 4/2015 | Angelov | G06F 11/0751 726/23 |
| 2015/0373036 A1 | 12/2015 | Patne et al. | |
| 2016/0176538 A1* | 6/2016 | Bekanich | G08G 5/0021 701/14 |
| 2016/0188876 A1* | 6/2016 | Harris | G06N 20/00 726/23 |
| 2016/0340055 A1 | 11/2016 | Floyd et al. | |
| 2016/0356922 A1* | 12/2016 | McCann | G01W 1/10 |
| 2016/0358497 A1 | 12/2016 | Nguyen et al. | |
| 2017/0006047 A1 | 1/2017 | Bharadwaj et al. | |
| 2017/0039370 A1 | 2/2017 | Mead et al. | |
| 2017/0039374 A1 | 2/2017 | Rubin | |
| 2017/0054752 A1 | 2/2017 | Nguyen et al. | |
| 2017/0099308 A1 | 4/2017 | Mead et al. | |
| 2017/0134400 A1 | 5/2017 | Nguyen et al. | |
| 2017/0148467 A1* | 5/2017 | Franklin | G10L 25/39 |
| 2017/0323492 A1* | 11/2017 | Gremmert | G01S 13/953 |
| 2017/0331895 A1* | 11/2017 | Manjunath | H04L 67/01 |
| 2017/0337813 A1* | 11/2017 | Taylor | G05D 1/0285 |
| 2018/0367553 A1* | 12/2018 | Hayden | H04L 63/1425 |
| 2019/0005744 A1* | 1/2019 | Curtis | G08G 5/0013 |
| 2019/0050515 A1* | 2/2019 | Su | G06N 3/045 |
| 2019/0162841 A1* | 5/2019 | Peckham | G01S 5/0027 |
| 2019/0190926 A1* | 6/2019 | Choi | G06N 3/08 |
| 2019/0385057 A1* | 12/2019 | Litichever | H04L 63/14 |
| 2020/0122656 A1* | 4/2020 | Dixit | B60R 16/0234 |
| 2020/0169578 A1* | 5/2020 | Rousse | G06F 21/554 |
| 2020/0294401 A1* | 9/2020 | Kerecsen | G05D 1/0287 |
| 2020/0389469 A1* | 12/2020 | Litichever | H04W 4/40 |
| 2021/0005332 A1* | 1/2021 | D'Angio | H04L 67/12 |
| 2021/0120024 A1* | 4/2021 | Ladd | H04L 12/40045 |
| 2021/0328978 A1* | 10/2021 | Buchanan | H04L 63/08 |
| 2022/0028287 A1* | 1/2022 | Durant | G06N 20/00 |
| 2022/0106060 A1* | 4/2022 | Morrison | H01M 8/04544 |
| 2022/0148445 A1* | 5/2022 | Bauer | G06T 17/05 |
| 2022/0255897 A1* | 8/2022 | Miele | G06N 3/02 |
| 2022/0315223 A1* | 10/2022 | Morrison | B60L 15/20 |
| 2022/0388674 A1* | 12/2022 | Kanagarajan | G08G 5/0004 |
| 2022/0414213 A1* | 12/2022 | Dixit | G06F 21/554 |
| 2023/0070608 A1* | 3/2023 | Sumien | H04L 63/1425 |

FOREIGN PATENT DOCUMENTS

| | | |
|---|---|---|
| KR | 20130027941 | 3/2013 |
| KR | 20160089800 | 7/2016 |
| WO | 2005074434 | 8/2005 |
| WO | 2008148756 | 12/2008 |
| WO | 2013144962 | 10/2013 |
| WO | 2016020660 | 2/2016 |
| WO | 2016151566 | 9/2016 |
| WO | 2017044446 | 3/2017 |

OTHER PUBLICATIONS

Aviation Security and Detection Systems—Case Study; ID: http://ec.europa.eu/home-affairs/sites/homeaffalrs/files/e-library/documents/policies/security/pdf/aviation_case_study_cses_en.pdf.

Increase operational safety, improve communications, and streamline efficiency in-aircraft, aircraft-to-aircraft, and aircraft to-ground—ID: http://www.thetaray.com/aviation/.

Intruder Alert: Industry Experts Weigh In on Cybersecurity Risks—See more at: https://apex.aero/2017/02/09/intruder-alert-industry-experts-weigh-cybersecurity-risks#sthash.KL4ifa5J.dpuf ID: http://apex.aero/2017/02/09/intruder-alert-industry-experts-weigh-cybersecurity-risks.

Title: Cyber Attack Vulnerabilities Analysis for Unmanned Aerial Vehicles ID: http://pdfs.semanticscholar.org/1a95/4775dd9a2596b7543af7693d707415077289.pdf.

Title: How digital airplanes influence airline information security ID: http://www.boeing.com/commercial/aeromagazine/articles/2012_q3/5/.

\* cited by examiner

COMPUTERIZED-SYSTEM AND COMPUTERIZED-METHOD FOR DETECTING CYBER-ATTACKS ON AVIONIC COMMUNICATIONS OF AN AIRBORNE COMPUTERIZED-DEVICE

TECHNICAL FIELD

The present disclosure relates to the field of software and hardware engineering, cyber security and network communication monitoring.

BACKGROUND

Current aircrafts consist of a variety of computerized systems to assist in flying the aircraft. For example, flight control systems, landing gear, hydraulic systems, engine bleed air system, fuel systems and the like, which are handling many tasks, such as monitoring flight sensors, controlling aircraft operations, interactions between components within the aircraft and the like. To handle these tasks, the aircraft systems, use different types of protocols and networks over which digital data is being exchanged between sensors and the computerized systems. The digital data being exchanged may relate to meteorology, aircraft maintenance, air traffic control authorizations, etc.

Moreover, sensors of aircrafts also exchange digital data related to meteorology, aircraft maintenance air traffic control and the like, with off-board systems, i.e., ground-based stations.

The deficiency of digital data that is being exchanged over the networks is that it may be exposed to cyber-attacks which may compromise the safety and functionality of the entire aircraft. As technology progresses, the amount of digital data that is required to operate and maintain the aircraft is steadily increasing, and accordingly the significance of protecting aircraft systems from cyber-attacks is also increasing.

For example, control sensors such as tachometer, engine temperature gauge, fuel- and oil-quantity gauge, pressure gauge, altimeter, airspeed-measurement, vertical speed indicators and others supply additional signals to cockpit indicators, informing the pilots to act or to be precautious, and prevent disaster or accident. False messages that supposedly originated from the ground station or the control sensor may be transmitted to one or more aircraft systems.

Another example, when using data bus protocol, such as Aeronautical Radio Incorporated (ARNIC) 429, as data transfer standard for generic medium-speed data sharing for private and commercial aircraft the preconfigured data rate or transmission speed, such as 12.5 kbit/s or 100 kbit/s may be changed which might be an indication of a cyber-attack.

In yet another example, a redundant e.g., dual-seat control system in an aircraft should provide the same information to the system related to the pilot and to the system related to the copilot. When there is a difference between the data provided in the two systems it may be a technical malfunction that should be fixed or a n indication of a cyber-attack.

Existing ground-based systems are designed to work on large scale networks running various of network protocols. Separate hardware appliances are used for the implementation of the ground-based systems; however, they are not suitable to be implemented in an aircraft due to size and computational requirements because they require additional power, add additional weight, increase cost, require additional space and also traditional IT cyber security solutions, which are designed for TCP/IP networks cannot be applied to ARINC 429 data bus protocol.

Aircraft systems are critical and sensitive, and therefore it is important to detect and protect aircrafts from cyber-attacks. Accordingly, there is a need for computerized-system and computerized-method for detecting, analyzing, and tracking attempted breaches in aircraft and for detecting cyber-attacks on avionic communications of an airborne computerized-device.

SUMMARY

There is thus provided, in accordance with some embodiments of the present disclosure, a computerized-system for anomaly detection of Point-to-Point avionic communication messages via a message-bus between an entity to one or more aircraft-systems in an aircraft during phases of flight, is provided herein.

In accordance with some embodiments of the present disclosure, the computerized-system includes: a bus-message queue to store bus-avionic-communication-messages transmitted via one or more input buses; an anomaly queue to store anomaly bus-messages; a memory to store the bus-message queue and the anomaly queue; a Cyber-Built In Test (C-BIT) mechanism to operate one or more preconfigured test routines; and one or more processors to operate a rule engine based on a preconfigured ruleset to detect one or more anomalies of bus-avionic-communication-messages for each bus-message in the bus-message queue.

Furthermore, in accordance with some embodiments of the present disclosure, the rule engine may be configured to store each bus-message that is detected as an anomaly in the anomaly queue and send one or more alerts to be presented via one or more external devices for each bus-message in the anomaly queue.

Furthermore, in accordance with some embodiments of the present disclosure, the entity may be at least one of: (i) airborne-electronic-sensor; (ii) sensor receiving data from off-board system.

Furthermore, in accordance with some embodiments of the present disclosure, the operating of the rule engine may include: (i) receiving from the message queue a bus-message having a timestamp and an equipment ID; (ii) operating a timing module to apply timing rules on the received bus-message, based on the received timestamp; (iii) operating a bit-compare module to apply rules on the received message based on data in the message; (iv) operating an Indication Of Compromise (IOC) module to mask and extract data references to detect one or more anomalous dependencies between indicators; and (v) operating a multi-message dependency module.

Furthermore, in accordance with some embodiments of the present disclosure, the operating of operations (ii)-(v) may be performed according to a preconfigured order.

Figure 2A:
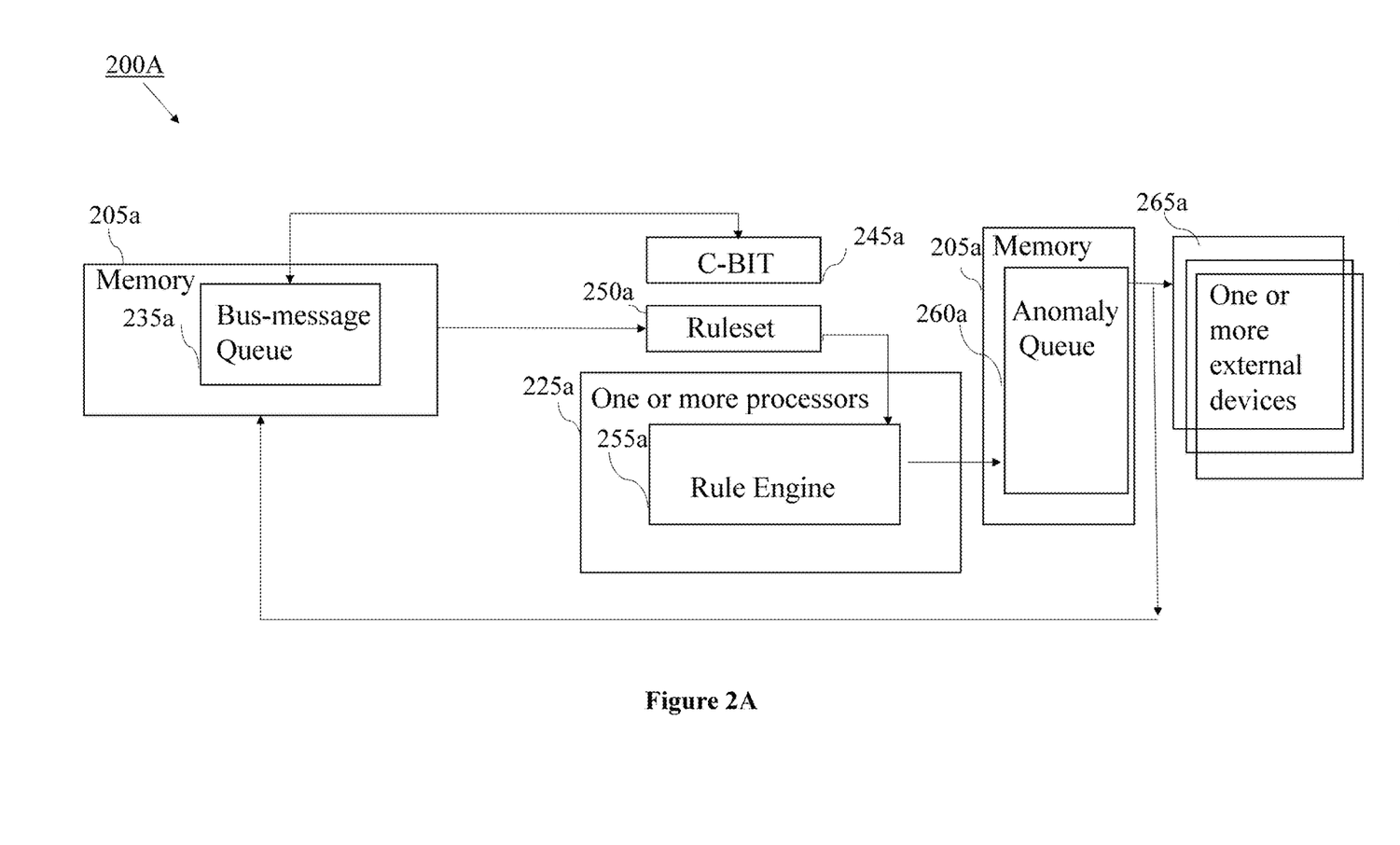
FIGS. 2A-2B illustrate a computerized-system for anomaly detection of Point-to-Point avionic communication messages via a message-bus between an entity to one or more aircraft-systems in an aircraft during phases of flight, in accordance with some embodiments of the present disclosure.
Figure 2B:
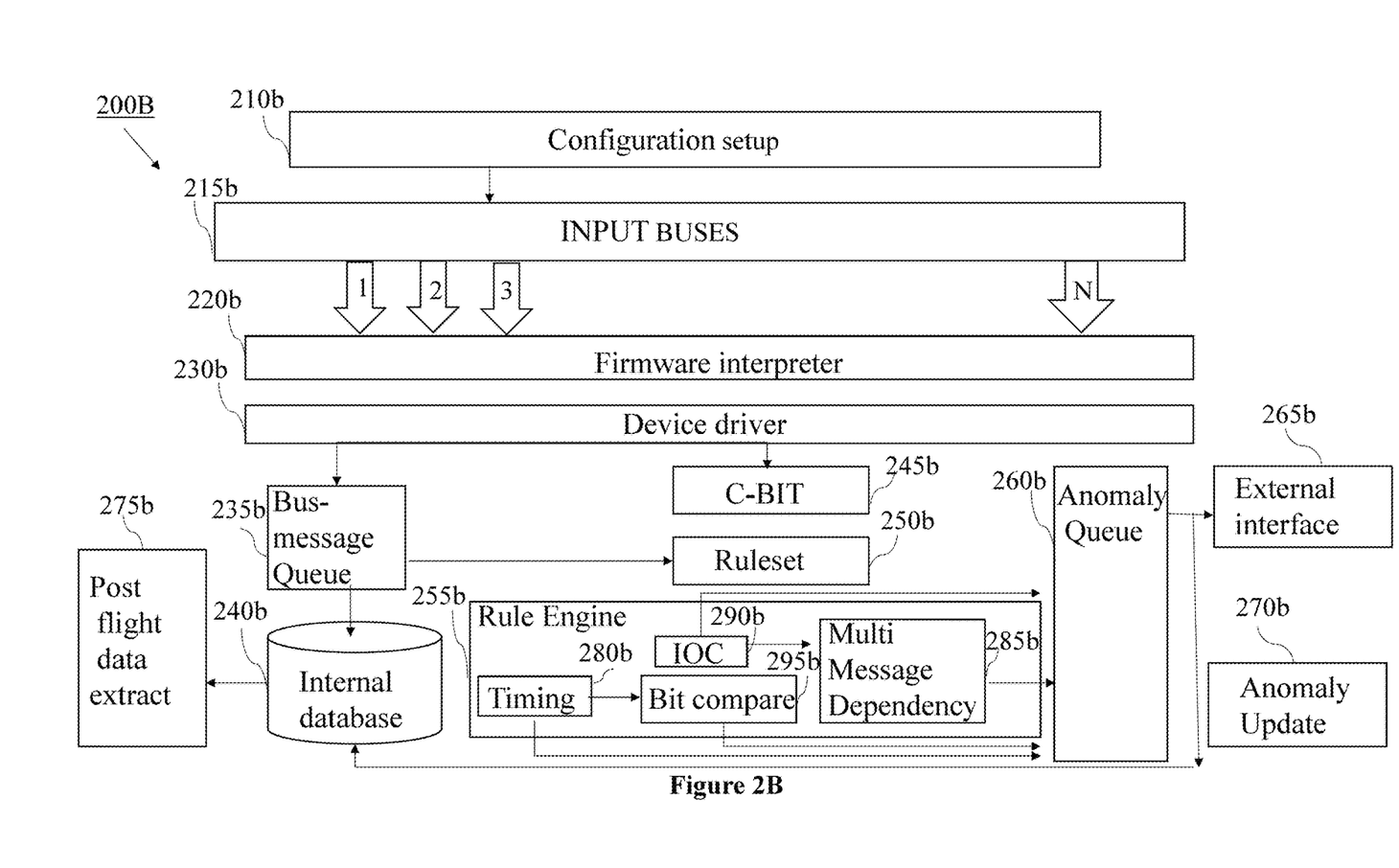

Furthermore, in accordance with some embodiments of the present disclosure, each bus-message may be stored in the bus-message queue after being obtained by one or more input buses based on a configuration setup forwarded to a firmware interpreter and then to a device driver, as shown in FIG. 2B. The firmware interpreter may be configured to receive electrical signals from the one or more input buses and to translate the received electrical signals to a raw stream of bus-messages data.

Furthermore, in accordance with some embodiments of the present disclosure, the device driver, may be configured to read bus-messages-data from the raw data stream provided by the firmware interpreter and to add to each bus-message: (i) a timestamp; (ii) a bus number; and (iii) equipment ID, according to the one or more input buses that the bus-message has been received.

Furthermore, in accordance with some embodiments of the present disclosure, the bus-message queue is configured to operate by a First In First Out (FIFO) technique.

Furthermore, in accordance with some embodiments of the present disclosure, the bus-message queue may be parallelly tunneling bus-messages to an internal database for offline analysis and to the rule engine, for real-time anomaly detection.

Furthermore, in accordance with some embodiments of the present disclosure, the computerized-system may be further configured to extract data from the internal database post flight.

Furthermore, in accordance with some embodiments of the present disclosure, after a bus-message may be evaluated by the rule engine and stored in the internal database, the bus-message may be removed from the bus-message queue.

Furthermore, in accordance with some embodiments of the present disclosure, each bus message of the bus-messages tunneled from the bus-message queue to the internal database may be stored with the bus-message timestamp and the bus number and an equipment ID.

Furthermore, in accordance with some embodiments of the present disclosure, the timing module may include validating at least one of following anomalies: (i) maximum threshold; (ii) message desync; (iii) denial of service; and (iv) invalid message distribution.

Furthermore, in accordance with some embodiments of the present disclosure, the bit compare module may include validating at least one of following anomalies: (i) unknown labels; (ii) unknown equipment IDs; (iii) mismatch mapping of labels to equipment ID; (iv) invalid bitmask; (v) invalid parity bit; (vi) Sign Status Matrix (SSM) failure warning; (vii) invalid data range; and (viii) invalid data continuity.

Furthermore, in accordance with some embodiments of the present disclosure, indicators may be bits which vary according to data it represents.

Furthermore, in accordance with some embodiments of the present disclosure, the one or more preconfigured test routines may include at least one of: (i) timestamp synchronization; (ii) all bits are zero, except parity bit; (iii) flat bit ones; (iv) flat data bits zeros; (v) flat data bits ones; (vi) whitelisted labels; and (vii) data congruity between buses, upper and lower thresholds for data, and timestamp synchronization between buses, in case of redundant buses.

Furthermore, in accordance with some embodiments of the present disclosure, the multi-message dependency module may include comparing between bus-messages of redundant systems to check that bus-messages of same type that have been sent during same period equals to or exceeds one or more preconfigured thresholds.

Furthermore, in accordance with some embodiments of the present disclosure, a computerized-method for anomaly detection of Point-to-Point avionic communication messages via a message-bus between an entity to one or more aircraft-systems in an aircraft during phases of flight is provided herein.

Furthermore, in accordance with some embodiments of the present disclosure, the computerized-method may include using C-BIT mechanism to operate one or more preconfigured test routines; operating a rule engine based on a preconfigured ruleset to detect one or more anomalies of bus-avionic-communication-messages for each bus-message in the bus-message queue; storing each bus-message that is detected by the rule engine as anomaly in an anomaly queue; and sending one or more alerts to be presented via one or more external devices for each bus-message in the anomaly queue.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the disclosure. Like components are denoted by like reference numerals.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

In computer architecture, a bus is a communication system that transfers data between components inside a computer, or between computers. Existing Control Area Network (CAN) bus solutions in vehicles may not be a good fit to be deployed in aircrafts due to different network protocol usage in aircrafts.

Other existing ground-based systems are designed to work on large scale networks which are running various network protocols, however, they require additional power, add additional weight, increase costs, and require additional space which are all limited in an aircraft.

Therefore, there is a need for a technical solution that will address cyber-attacks deployed on avionic communications of commercial and private jet aircraft by monitoring a subset of avionic communications and detecting anomalies.

Furthermore, there is a need for a system and method for anomaly detection of Point-to-Point avionic communication messages via a message-bus between an entity, such as an airborne-electronic-sensor or a sensor receiving data from an off-board system, i.e., ground operations (Ops) to one or more aircraft-systems in an aircraft during phases of flight, which will be dedicated to ARNIC 429 protocol.

Figure 1:
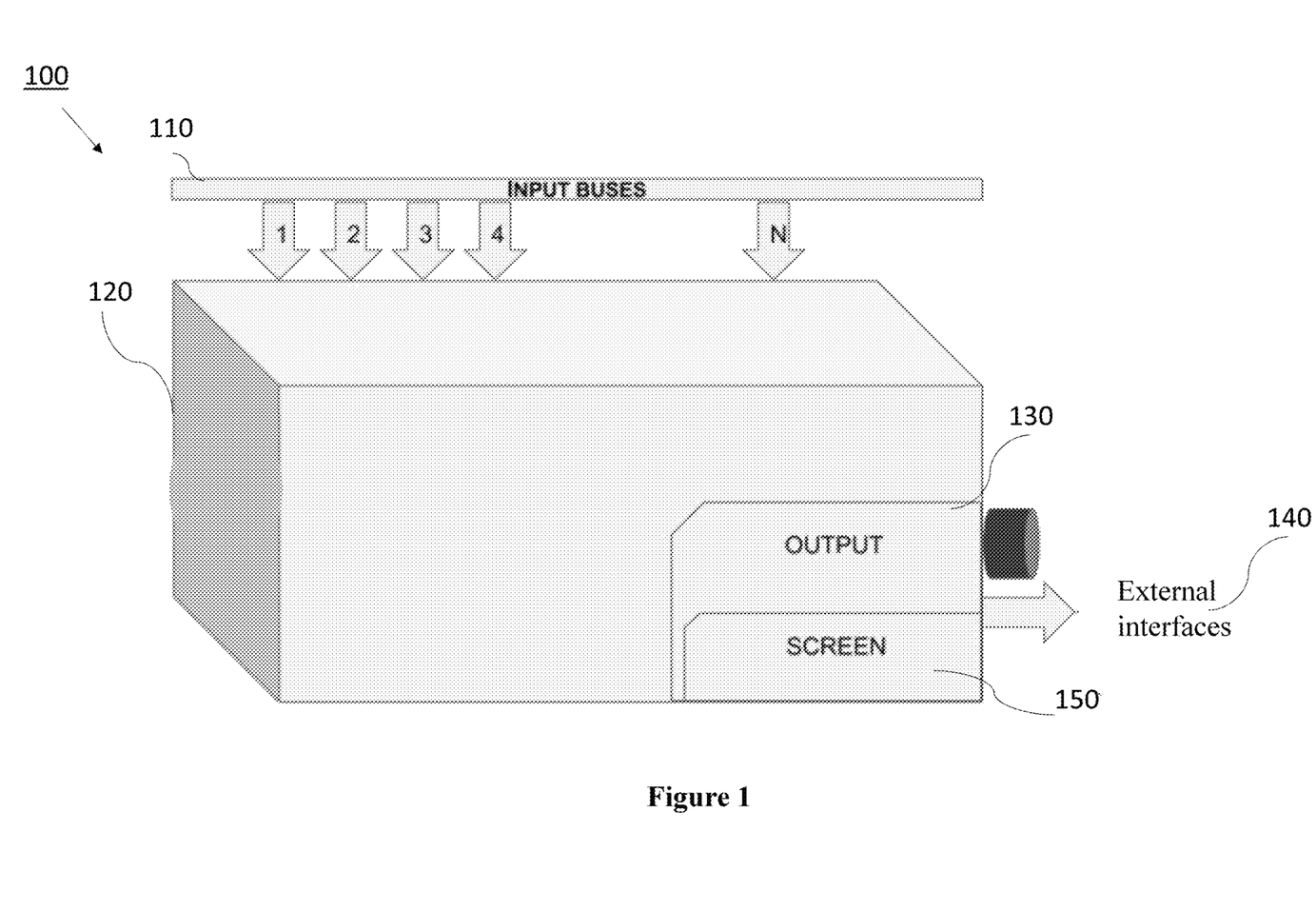
FIG. 1 schematically illustrates a high-level diagram of a computerized-system for anomaly detection of Point-to-Point avionic communication messages via a message-bus between an entity to one or more aircraft-systems in an aircraft during phases of flight, in accordance with some embodiments of the present disclosure.

FIG. 1 schematically illustrates a high-level diagram of a computerized-system 100 for anomaly detection of Point-to-Point avionic communication messages via a message-bus between an entity to one or more aircraft-systems in an aircraft during phases of flight, in accordance with some embodiments of the present disclosure.

According to some embodiments of the present disclosure, a system, such as computerized-system 100 for anomaly detection of Point-to-Point avionic communication messages, via a message-bus between an entity, such as an airborne-electronic-sensor or a sensor receiving data from an off-board system to one or more aircraft-systems in an aircraft during phases of flight, may be an airborne device for monitoring and cyber anomaly detection of avionics communications. The phases of flight may be pre departure, take-off run, take-off flight phase, descending, landing and approach.

According to some embodiments of the present disclosure, the computerized-system 100 may be based on a Commercial Of The Shelf (COTS) that is airborne certified and may include the required input buses 110, e.g., Aeronautical Radio Incorporated (ARNIC) 429 channels and output standard channels 130, such as standard Universal Serial Bus (USB) or Ethernet channels for maintenance laptop connection.

According to some embodiments of the present disclosure, the output channels 130 may include capability to transmit data to external interfaces 140, such as ground ops via standard Very High Frequency (VHF) or other radio frequency connectivity, cockpit's printer, Electronic Flight Bag (EFB) and a screen 150, such as Liquid-Crystal Display (LCD) screen connected to the device 120 itself According to some embodiments of the present disclosure, the device 120 may provide Intrusion Detection System (IDS) only, by monitoring the data buses and alerting of any anomalies found. Thus, the pilot may not rely on the information provided by the system and may or may not act according to Quick Reference Handbook (QRH), i.e., a checklist routine defined by the regulator.

According to some embodiments of the present disclosure, since the device 120 is a listener only on the input buses 110, the device 120 may not transmit any data, command, or other pulses on the avionic internal buses.

FIG. 2A illustrates a computerized-system 200A for anomaly detection of Point-to-Point avionic communication messages via a message-bus between an entity to one or more aircraft-systems in an aircraft during phases of flight, in accordance with some embodiments of the present disclosure. The entity may be an airborne electronic sensor or a sensor receiving data from an off-board system.

Figure 3:
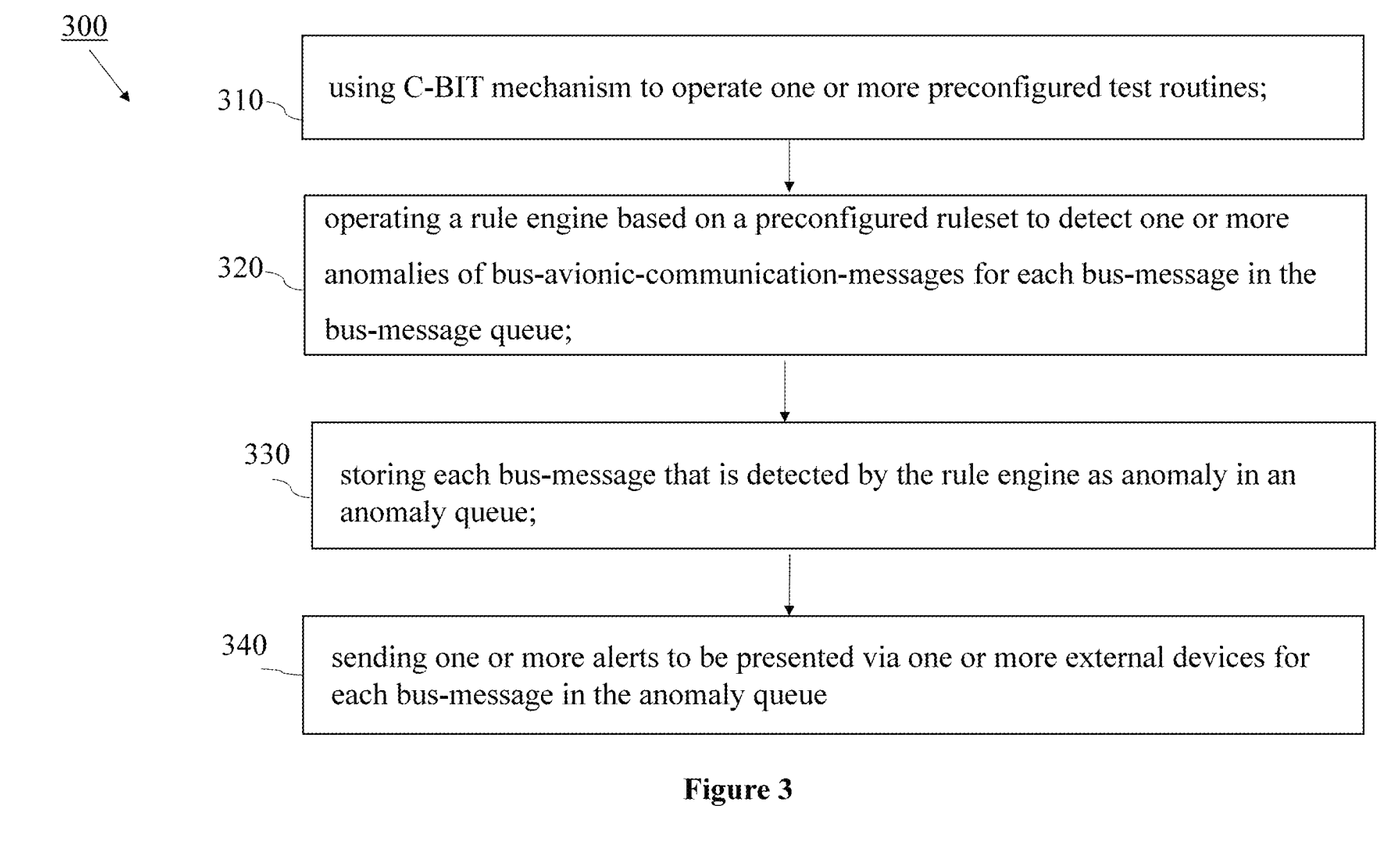
FIG. 3 is a schematic flowchart of a computerized-method for anomaly detection of Point-to-Point avionic communication messages via a message-bus between an entity to one or more aircraft-systems in an aircraft during phases of flight, in accordance with some embodiments of the present disclosure.

According to some embodiments of the present disclosure, system 200A may implement a computerized method, such as computerized-method 300 for anomaly detection of Point-to-Point avionic communication messages via a message-bus between an entity to one or more aircraft-systems in an aircraft during phases of flight.

According to some embodiments of the present disclosure, a procedure, such as Cyber-Build-In-Test (C-BIT) mechanism 245a may be running during the first load of the system 200A for a predefined timeframe. The purpose of the C-BIT mechanism 245a may be to validate a preconfigured subset of possible anomalies before running a full diagnostic, by a rule engine, such as rule engine 255a, in order to rule out monitored devices or systems compromise prior to loading the system 200A.

According to some embodiments of the present disclosure, the C-BIT mechanism 245a, may also operate one or more preconfigured test routines. One or more processors 225a may operate a rule engine 255a based on a preconfigured ruleset, such as ruleset 250a to detect one or more anomalies of bus-avionic-communication-messages for each bus-message in the bus-message queue 235a.

According to some embodiments of the present disclosure, the bus-message queue 235a and the anomaly queue 260a may be stored in memory 205a. The bus-message queue 235a may be implemented as a First In First Out (FIFO) queue that stores all the bus-messages that have been transmitted on the one or more input buses 215a.

According to some embodiments of the present disclosure, the one or more preconfigured test routines may include at least one of: timestamp synchronization; all bits are zero, except parity bit; flat bit ones; flat data bits zeros; flat data bits ones; whitelisted labels; and data congruity between buses, upper and lower thresholds for data, and timestamp synchronization between buses, in case of redundant buses.

According to some embodiments of the present disclosure, the rule engine 255a may be configured to store each bus-message that is detected as an anomaly in the anomaly queue 260a for real-time anomaly detection and send one or more alerts to be presented via one or more external devices 265a for each bus-message in the anomaly queue 260a.

According to some embodiments of the present disclosure, the ruleset 250a may be an input of the rule engine 255a which may contain a wide range of cyber rules to apply to each bus-message of the bus-messages which are transmitted on the one or more input buses 215a. The ruleset 250a may be adjusted to include a different set of rules, for each aircraft type and for each tail number, i.e., an alphanumeric code between two and six characters in length used to identify a specific airplane.

According to some embodiments of the present disclosure, the rules which are preconfigured to be included in the ruleset 250a may be determined by the aircraft tail number system spec, network, devices, and additional information that may vary between aircrafts. During 20-40 years of service, each aircraft gets maintenance, upgraded devices, and sometimes downgraded. There may be differences between devices of identical aircraft models, but the aircraft tail number may differ.

According to some embodiments of the present disclosure, the ruleset 250a may be updated from time to time, during standard post flight system updates. Changes to the ruleset 250a during flight may not be permitted and it may be denied.

According to some embodiments of the present disclosure, the ruleset 250a may be implemented as an encrypted binary file that may be loaded once on system load procedure or after a system restart.

According to some embodiments of the present disclosure, the rule engine 255a may be a heuristic, algorithm-based engine that makes real-time, 'thumb-ruling' decisions, based on the spec of the ruleset 250a. By the setup specified in internal modules of the rule engine 255a, each bus-message of the bus-messages may be processed and searched for anomalies. Once an anomaly is found in any of the internal modules, the anomalous message may be pushed to an anomaly queue 260a and the rule engine 255a may continue to process the next bus-message.

According to some embodiments of the present disclosure, the operating of the rule engine 255a may include the following internal modules: (i) receiving from the message queue a bus-message having a timestamp and an equipment ID; (ii) operating a timing module to apply timing rules on the received bus-message, based on the received timestamp; (iii) operating a bit-compare module to apply rules on the received message based on data in the message; (iv) operating an Indication Of Compromise (IOC) module to mask and extract data references to detect one or more anomalous dependencies between indicators; and (v) operating a multi-message dependency module.

According to some embodiments of the present disclosure, the equipment ID provides a way to differentiate between identical messages, identical labels and similar data in redundant systems, like left and right gears. For example, when using Pitot sensors, each pilot, the captain and the co-pilot, have a different sensor which is a transmitter, handling similar data, on different buses, to provide the required redundancy.

According to some embodiments of the present disclosure, the operating of operations (ii)-(v) may be performed according to a preconfigured order.

According to some embodiments of the present disclosure, the anomaly queue 260a may be a message alerting FIFO queue. Once an anomaly is detected, the anomalous message may be added to the anomaly queue 260a. Anomalous messages may be found during the operation of the C-BIT mechanism 245a, which is the device load and up to a predefined time frame, or while bus-messages are being evaluated in the rule engine 255a with accordance definitions of the ruleset 250a.

According to some embodiments of the present disclosure, according to a predetermined configuration, bus-messages may be tunneled to one or more external devices 265b. Once the oldest bus-message is tunneled, it may be popped out from the anomaly 260b.

According to some embodiments of the present disclosure, a bit modification may occur which might indicate of a cyber-attack. The modification may be detected by a timing module, such as timing module 280b in FIG. 2B.

FIG. 2B illustrates a computerized-system 200B for anomaly detection of Point-to-Point avionic communication messages via a message-bus between an entity to one or more aircraft-systems in an aircraft during phases of flight, in accordance with some embodiments of the present disclosure.

According to some embodiments of the present disclosure, system 200B may include the components of system 200A in FIG. 2A. The entity may be an airborne electronic sensor or a sensor receiving data from an off-board system.

According to some embodiments of the present disclosure, system 200B may be implemented as a device which is based on a Commercial Off the Shelf (COTS) that is airborne certified and contains input channels such as ARINC-429 input channels and output standard channels, such as standard USB/Ethernet channels for maintenance laptop connection.

Aeronautical Radio Incorporated (ARINC)-429 is a technical standard for the predominant avionics data bus used on commercial and transport aircraft. It defines the physical and electrical interfaces of a two-wire data bus and a data protocol to support an aircraft's avionics local area network. Data words are 32 bits in length and most messages consist of a single data word. Messages are transmitted at either 12.5 or 100 kbit/s to other system elements that are monitoring the bus messages. The transmitter constantly transmits either 32-bit data words or the NULL state (0 Volts). The protocol allows for self-clocking at the receiver end, thus eliminating the need to transmit clocking data.

According to some embodiments of the present disclosure, a configuration setup 210b may determine data that may enter to one or more input buses 215b, numbered as '1'through 'N'. The one or more input buses 215b are the physical layer that carries electronic signals, within the avionics domain, e.g., cockpit. The input buses 215b may deliver data from one or more sensors to one or more computerized systems to assist in flying the aircraft, according to an ARINC protocol, e.g., ARINC-429.

According to some embodiments of the present disclosure, the one or more sensors may be for example, control sensors such as tachometer, engine temperature gauge, fuel- and oil-quantity gauge, pressure gauge, altimeter, airspeed-measurement, vertical speed indicators and others supply additional signals to cockpit indicators, which are informing the pilots to act or to be precautious. The information may be received from one sensor by several systems and presented to the pilots by a display unit that may be associated to one of the systems, such as, flight control systems, landing gear, hydraulic systems, engine bleed air system, fuel systems and the like.

According to some embodiments of the present disclosure, the input buses 215b to the device can range from a single bus to 'N' parallel buses, e.g., 16 parallel buses. The one or more sensors that transmits data to the system 200B may be for example, point to point communicators or redundant transmitters, transmitting from left and right in parallel.

According to some embodiments of the present disclosure, the firmware interpreter 220b may translate electrical signals to a raw stream of data which may be forwarded to a device driver 230b. The bus-message is physically transmitted on the bus and then may be interpreted by the firmware interpreter 220b in the firmware layer and then translated to bits in the device driver 230b.

According to some embodiments of the present disclosure, the device driver 230b may read data from the raw data stream provided by the firmware interpreter 220b, commonly in chunks of 32 bits based on the ARINC protocol that is being used. The device driver 230b also adds to the bus-message a timestamp of a received bus-message and a bus indication according e.g., bus number, according to the input bus of the input buses 215b and also the equipment ID of the transmitting system.

According to some embodiments of the present disclosure, a bus-messages may be tunneled in parallel to the bus-message queue 235*b* for later on storage on the internal database 240*b* and offline analysis. The bus-message is physically transmitted on the bus, which is a physical layer.

According to some embodiments of the present disclosure, after a bus-message is evaluated by the rule engine 255*b* and stored in a database, such as the internal database 240*b*, the bus-message may be removed from the bus-message queue 235*b*.

According to some embodiments of the present disclosure, each queued bus-message may be tunneled in parallel into the internal database 240*b*, in order to store all the raw data on the one or more input buses 215*b* and into the rule engine 255*b* in order to evaluate the messages against a preconfigured ruleset, such as ruleset 250*b*. Once a bus-message is stored in the internal database 240*b* and evaluated by the rule engine 255*b*, it may be popped out from the bus-message queue 235*b*.

According to some embodiments of the present disclosure, since each message in the anomaly queue 260*b* may be also stored in the internal database 240*b* an anomaly update 270*b* process may find a relevant bus-message and may update the anomaly found and recorded in the anomaly queue 260*b*.

According to some embodiments of the present disclosure, the internal database 240*b* may store all the bus-messages that have been transmitted on the one or more input buses 215*b* with the added data of timestamp of transmission, a bus number, i.e., on which input bus out of the one or more input buses 215*a*, each bus-message has been transmitted on and an equipment ID.

According to some embodiments of the present disclosure, all the bus-messages in the anomaly queue 260*b* may be messages containing anomaly data, and so, each message anomaly may be updated in the internal database 240*b* using an anomaly update 270*b* process and later on tunneled to the configured external interfaces 265*b*.

According to some embodiments of the present disclosure, data may be extracted from the internal database 240*b* post flight for further analysis.

According to some embodiments of the present disclosure, post flight data extract 275*b* may be conducted once the aircraft is at jet bridge, i.e., air gate, connected to the airport's gate link or at other types of standard service connection, such as maintenance laptop. The data stored may be downloaded in a secured manner for ground-ops analysis.

According to some embodiments of the present disclosure, rule engine 255*b* may include a timing module 280*b*. The timing module 280*b* may apply preconfigured rules which are based on the timestamps of the bus-messages, which reflect when the bus-message was sent from the sensor. The timing rules of the timing module 280*b* may validate at least one of the following anomalies: maximum threshold, message de-sync, denial of service and invalid message distribution. For example, when label 0×15 is expected to arrive every 50 ms, and the maximum time threshold is defined as 51 ms, the timing module 280*b* may check, a gap between two messages with label 0×15 and if the gap is a 70 ms gap, the timing module 280*b* may send an alert as to a cyber-attack.

According to some embodiments of the present disclosure, rule engine 255*b* may also include a bit-compare module 295*b*. The bit-compare module 295*b* may apply rules which are based on the actual data being sent in the message. The bit-compare rules of the bit compare module 295*b* may validate at least one of the following anomalies: unknown labels, unknown equipment IDs, mismatch mapping of labels to equipment ID, invalid bitmask, invalid parity bit, SSM failure warnings, invalid data range, invalid data continuity.

For example, the bit-compare module 295*b* may send an alert when there when a rule related to an invalid bitmask is being violated. An invalid bitmask rule may be violated, when a bit is activated when it is not supposed to be activated, according to ARNIC 429 specification, e.g., since the bit is reserved, not used, padding and the like.

According to some embodiments of the present disclosure, the bit-compare module 295*b* may identify for example, a sensor of the fuel system may transmit data as to increased amount of fuel after the aircraft is in the air for a certain amount of time.

According to some embodiments of the present disclosure, rule engine 255*b* may also include an Indication Of Compromise (IOC) module 290*b*. The IOC module 290*b* may be an algorithm-based module, handling of masking and extracting different data references in order to detect possible anomalous dependencies between different indicators. The indicators are specific bits that vary between different data it represents. For example, wind speed indicators will rely on different bit sets than altitude indicators.

According to some embodiments of the present disclosure, the IOC module 290*b* may be implemented by Artificial Intelligence (AI) techniques, such as machine learning modules or deep learning models which use artificial neural networks.

According to some embodiments of the present disclosure, commonly each pilot system is accompanied with a co-pilot system, each having a different equipment ID. From time to time the two systems may not present the same information with regards to the same situation. The difference between the presented information may be due to an error or due to a cyber-attack. Therefore, the rule engine 255*b* may also include a multi message dependency module 285*b*. For redundant systems or devices, such as left/right pilot sensors, the multi dependency module 285*b* may compare reported data to preconfigured thresholds and may distinguish between the redundant systems by their equipment ID. For example, label 0×16 should be transmitted twice in a second, from the Pitot sensor, equipment ID left and from the Pitot sensor equipment ID right. If the right Pitot sensor transmitted once in a second, and the left Pitot sensor transmitted twice, the right Pitot sensor is suspected based on the equipment ID, to be under attack.

According to some embodiments of the present disclosure, the multi dependency module 285*b* may compare between bus-messages of redundant systems to check that bus-messages of similar type that have been sent during same period equals to or exceeds one or more preconfigured thresholds. Meaning, in a situation where there is a difference between information in the pilot system and the co-pilot system, the difference may be up to the preconfigured threshold before an alert may be sent as to cyber-attack.

FIG. 3 is a schematic flowchart of a computerized-method 300 for anomaly detection of Point-to-Point avionic communication messages via a message-bus between an entity to one or more aircraft-systems in an aircraft during phases of flight, in accordance with some embodiments of the present disclosure. The entity may be an airborne electronic sensor or a sensor receiving data from an off-board system.

According to some embodiments of the present disclosure, operation 310 may comprise using C-BIT mechanism to operate one or more preconfigured test routines. The C-BIT mechanism may be a C-BIT mechanism such as C-BIT 245*a* in FIG. 2A and C-BIT 245*b* in FIG. 2B.

According to some embodiments of the present disclosure, operation 320 may comprise operating a rule engine based on a preconfigured ruleset to detect one or more anomalies of bus-avionic-communication-messages for each bus-message in the bus-message queue. The rule engine may be a rule engine such as rule engine 255a in FIG. 2A and rule engine 255b in FIG. 2B. The bus-message queue may be bus-message queue 235a in FIG. 2A and bus-message queue 235b in FIG. 235b in FIG. 2B.

According to some embodiments of the present disclosure, operation 330 may comprise storing each bus-message that is detected by the rule engine as anomaly in an anomaly queue. The anomaly queue may be a queue, such as anomaly queue 260a in FIG. 2A and anomaly queue 260b in FIG. 2B.

According to some embodiments of the present disclosure, sending one or more alerts to be presented via one or more external devices for each bus-message in the anomaly queue. The alerts may be related to cyber-attack. For example, the alerts may include timestamp, equipment ID, bus ID, label and attack key. It may also include, when configured to, an attack description elaborating the attack type It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-system for anomaly detection of Point-to-Point avionic communication messages via a message-bus between an entity to one or more aircraft-systems in an aircraft during phases of flight, the computerized-system comprising:

a bus-message queue to store bus-avionic-communication-messages transmitted via one or more input buses;

an anomaly queue to store anomaly bus-messages;

a memory to store the bus-message queue and the anomaly queue;

a Cyber-Built In Test (C-BIT) mechanism to operate one or more preconfigured test routines;

and one or more processors to operate a rule engine based on a preconfigured ruleset to detect one or more anomalies of bus-avionic-communication-messages for each bus-message in the bus-message queue;

said rule engine is configured to store each bus-message that is detected as an anomaly in the anomaly queue and send one or more alerts to be presented via one or more external devices for each bus-message in the anomaly queue,     wherein the operating of the rule engine comprising of:
- (i) receiving from the message queue a bus-message having a timestamp and an equipment ID;
- (ii) operating a timing module to apply timing rules on the received bus-message, based on the received timestamp;
- (iii) operating a bit-compare module to apply rules on the received message based on data in the message;
- (iv) operating an Indication Of Compromise (IOC) module to mask and extract data references to detect one or more anomalous dependencies between indicators; and
- (v) operating a multi-message dependency module, and wherein each bus-message is stored in the bus-message queue after being obtained by one or more input buses based on a configuration setup forwarded to a firmware interpreter and then to a device driver.

2. The computerized-system of claim 1 wherein the entity is at least one of: (i) airborne-electronic-sensor; and (ii) sensor receiving data from an off-board system.

3. The computerized-system of claim 1, wherein the operating of (ii)-(v) is according to a preconfigured order.

4. The computerized-system of claim 1, wherein the firmware interpreter is configured to receive electrical signals from the one or more input buses and to translate the received electrical signals to a raw stream of bus-messages data.

5. The computerized system of claim 1, wherein the device driver is configured to read bus-messages-data from the raw data stream provided by the firmware interpreter and to add to each bus-message: (i) a timestamp; (ii) a bus number; and (iii) equipment ID, according to the one or more input buses that the bus-message has been received.

6. The computerized-system of claim 1, wherein the bus-message queue is configured to operate by a First In First Out (FIFO) technique.

7. The computerized-system of claim 1, wherein the bus-message queue is parallelly tunneling bus-messages to an internal database for offline analysis and to the rule engine, for real-time anomaly detection.

8. The computerized-system of claim 6, wherein the computerized-system is further configured to extract data from the internal database post flight.

9. The computerized-system of claim 6, wherein after a bus-message is evaluated by the rule engine and stored in the internal database, the bus-message is removed from the bus-message queue.

10. The computerized-system of claim 4, wherein each bus message of the bus-messages tunneled from the bus-message queue to the internal database are stored with the bus-message timestamp and the bus number and an equipment ID.

11. The computerized-system of claim 1, wherein the timing module consists of validating at least one of following anomalies: (i) maximum threshold; (ii) message desync; (iii) denial of service; and (iv) invalid message distribution.

12. The computerized-system of claim 1, wherein the bit compare module consists of validating at least one of following anomalies: (i) unknown labels; (ii) unknown equipment IDs; (iii) mismatch mapping of labels to equipment ID; (iv) invalid bitmask; (v) invalid parity bit; (vi) Sign Status Matrix (SSM) failure warning; (vii) invalid data range; and (viii) invalid data continuity.

13. The computerized-system of claim 1, wherein the indicators are bits which vary according to data it represents.

14. The computerized-system of claim 1, wherein the one or more preconfigured test routines include at least one of:
  (i) timestamp synchronization;
  (ii) all bits are zero, except parity bit;
  (iii) flat bit ones;
  (iv) flat data bit zeros;
  (v) flat data bit ones;
  (vi) whitelisted labels; and
  (vii) data congruity between buses, upper and lower thresholds for data, and timestamp synchronization between buses, in case of redundant buses.

15. The computerized-system of claim 1, wherein the multi-message dependency module comprising comparing between bus-messages of redundant systems to check that bus-messages of same type that have been sent during same period equals to or exceeds one or more preconfigured thresholds.

16. A computerized-method for anomaly detection of Point-to-Point avionic conummication messages via a message-bus between an entity to one or more aircraft-systems in an aircraft during phases of flight, the computerized-method comprising:
  using C-BIT mechanism to operate one or more preconfigured test routines;
  operating a rule engine based on a preconfigured ruleset to detect one or more anomalies of bus-avionic-communication-messages for each bus-message in the bus-message queue;
  storing each bus-message that is detected by the rule engine as anomaly in an anomaly queue; and
  sending one or more alerts to be presented via one or more external devices for each bus-message in the anomaly queue,
  wherein the operating of the rule engine comprising of:
    (i) receiving from the message queue a bus-message having a timestamp and an equipment ID;
    (ii) operating a timing module to apply timing rules on the received bus-message, based on the received timestamp;
    (iii) operating a bit-compare module to apply rules on the received message based on data in the message;
    (iv) operating an Indication Of Compromise (IOC) module to mask and extract data references to detect one or more anomalous dependencies between indicators; and
    (v) operating a multi-message dependency module, and
  wherein each bus-message is stored in the bus-message queue after being obtained by one or more input buses based on a configuration setup forwarded to a firmware interpreter and then to a device driver.

\* \* \* \* \*